United States Patent [19]

Mrowiec et al.

[11] Patent Number: 5,488,532
[45] Date of Patent: Jan. 30, 1996

[54] SYSTEM OF PROTECTION FOR ELECTRIC POWER DISTRIBUTION FAILURES

[75] Inventors: David J. Mrowiec, Rockford, Ill.; Jef W. Good, Beloit, Wis.

[73] Assignee: Sundstrand Corporation, Rockford, Ill.

[21] Appl. No.: 144,071

[22] Filed: Oct. 27, 1993

[51] Int. Cl.⁶ .................................................. H02H 3/00
[52] U.S. Cl. .............................. 361/63; 361/87; 361/52
[58] Field of Search .................................. 361/42, 49, 47, 361/48, 52, 63, 64, 76, 78, 87

[56] References Cited

U.S. PATENT DOCUMENTS

| | | | |
|---|---|---|---|
| 3,223,891 | 12/1965 | McClymont | 361/76 |
| 3,938,006 | 2/1976 | Gadwal et al. | 361/76 |
| 4,862,308 | 8/1989 | Udren | 361/87 |

*Primary Examiner*—A. D. Pellinen
*Assistant Examiner*—Ronald W. Leija

*Attorney, Agent, or Firm*—Jeffery J. Makeever

[57] ABSTRACT

A system of protection for an electric power distribution system which has at least two parallel power feeders for each electrical phase coupling a source of electrical energy through a contactor device to a load distribution bus comprises a controller, and a parallel feeder current sensor for each parallel power feeder which sense electrical current conducted therein. The parallel feeder current sensors produce output parallel current sense signals proportional to the magnitude of the parallel feeder current sensed, and are coupled to the controller by conductors which communicate the output parallel current sense signals thereto. The controller comprises circuitry which compares the magnitudes of the output parallel current sense signals for each electrical phase. This comparison circuitry generates a first output protection signal when the magnitudes of the output parallel current sense signals differ by at least an amount sufficient to indicate a high impedance fault on at least one of the parallel power feeders. The protection system further comprises circuitry to isolate the high impedance fault by opening the contactor device and de-energizing the source of electrical energy.

29 Claims, 3 Drawing Sheets

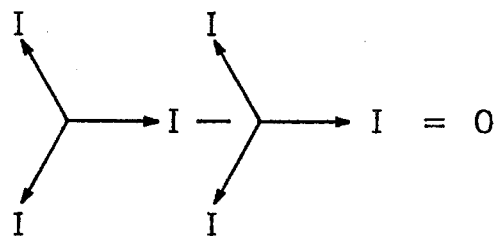
FIG. 2a
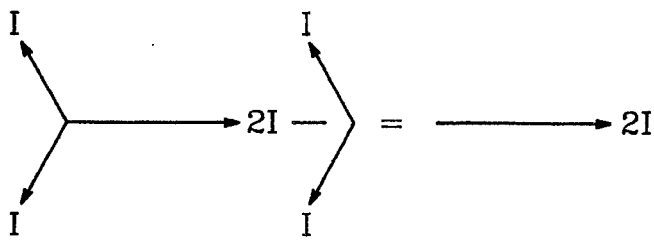
FIG. 2b
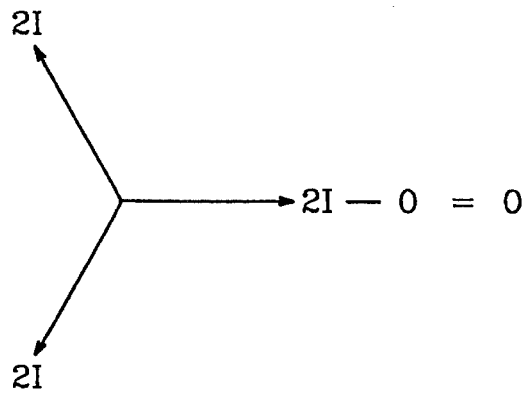
FIG. 2c
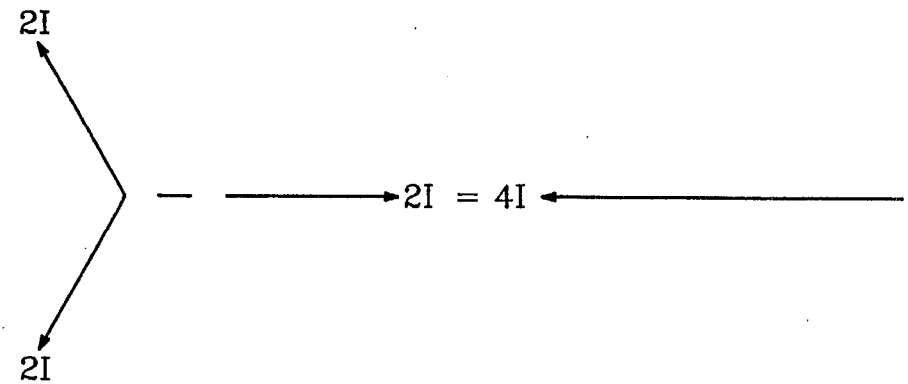
FIG. 2d
FIG. 2 (PRIOR ART)

SYSTEM OF PROTECTION FOR ELECTRIC POWER DISTRIBUTION FAILURES

FIELD OF THE INVENTION

The present invention relates generally to electric power distribution, and more particularly to a system of protection for an electric power distribution system having parallel feeders.

BACKGROUND ART

On an aircraft every pound of additional weight translates directly into increased fuel burn and increased operating costs for the airlines. As airlines tend to purchase and operate only the safest, most cost and fuel efficient aircraft available on the market, obvious financial penalties exist for systems which are delivered overweight. Of paramount importance to an aircraft system designer then, in addition to the obvious safety and reliability concerns, is system weight. Since many of the design parameters are fixed, the designer must utilize advanced techniques to reduce overall system weight.

One of these advanced techniques utilized for electric power generation systems on aircraft is the use of parallel power feeders for power distribution from the engine mounted generators to the electrical power distribution center. With this technique two small aluminum power feeders are used to conduct the current generated by each electrical phase of the generator, as opposed to a single larger copper feeder for each phase as is typical in ground based power distribution systems.

FIG. 1 illustrates a partial single channel of an aircraft electric power generation system utilizing this advanced technique. Each output electrical phase 10, 12, 14 of the engine driven generator 16 is coupled by a single copper power feeder 18, 20, 22 to a terminal block 24 within the aircraft outside the engine nacelle (not shown). These copper power feeders 18, 20, 22 are required due to the harsh environment of this nacelle area through which they are routed. Once within the body of the aircraft however, two parallel aluminum feeders 18a and 18b, 20a and 20b, 22a and 22b are utilized to conduct the electrical energy produced by the generator 16. These parallel feeders 18a and 18b, 20a and 20b, 22a and 22b are coupled to each phase on the terminal block 24, grouped into two three-phase bundles, and routed through the aircraft to a second terminal block 26 which is located near the electrical power distribution center in the nose of the aircraft (not shown). From this terminal block 26 a single copper power feeder 18c, 20c, 22c conducts the electrical energy through the generator line contactor 28 to the load distribution buses (not shown).

To achieve a significant weight savings, each aluminum parallel feeder 18a, 18b, 20a, 20b, 22a, 22b is sized to conduct only one half of the rated capacity per phase of the generator. A problem associated with this sizing decision, however, is that if one of these small parallel feeders 18a were to break or become disconnected from the terminal block 24, the other parallel feeder 18b would be required to conduct the full capacity of that phase of the generator. Under heavy loading conditions, the unfaulted parallel feeder 18b will become overloaded and may present a fire hazard.

To prevent such an occurrence, two, single torroid parallel feeder current transformers 30, 32 are used to sense the current conducted by each parallel feeder bundle. The output of one parallel feeder current transformer 30 is cross coupled to the output of the other parallel feeder current transformer 32. FIG. 2 illustrates the sensed current vector subtraction which results from this cross coupling of outputs. In FIG. 2a the distribution system is free of faults; the current carried in each parallel feeder bundle is equal; and the output transmitted to the level detector circuitry 38 of the generator control unit 34 via line 36 is zero.

If one of the parallel feeders were to open however, as illustrated in FIG. 2b, the current sensed by each current transformer will no longer be equal and the vector subtraction will no longer result in a null output. This non-zero result is transmitted to the level detector circuitry 38 which then generates a fault flag on line 40. Protection logic 42 within the generator control unit 34 processes this flag and generates a protective trip signal on line 44. The exciter control circuitry 46 is responsive to this trip signal to de-energize the generator 16 by removing the excitation drive current from line 48. The generator line contactor driver circuitry 62 is also responsive to the protective trip signal to trip open the generator line contactor 28 via line 63 to disconnect the generator 16 from the load buses.

FIG. 2c illustrates the need to cross one of the parallel feeders 18a, 18b from each parallel feeder bundle to the other just prior to the parallel feeder current sensors 30, 32. For this vector diagram it is assumed that all parallel feeders remain in their respective bundle from the first terminal block 24 to the second terminal block 26, that is no parallel feeder is crossed over as shown in FIG. 1, and that one of the parallel feeder bundles is completely severed in half. A comparison of the resultant of the vector subtraction with the resultant of the no-fault condition as illustrated in FIG. 2a reveals that, although half of the parallel feeders are conducting two times their rated capacity, no fault is indicated to the generator control unit 34. As illustrated in FIG. 2d, by transposing one of the parallel feeders just prior to the parallel feeder current sensors (FIG. 1), the same fault severing completely one of the parallel feeder bundles is now detectable by the generator control unit 34.

One problem associated with this parallel feeder transposition, however, is that accurate current level sensing is not possible at low loading levels when one of the transposed parallel feeders is faulted. Errors as great as 33 percent have been observed in some systems utilizing this parallel feeder bundle sensing technique. Although it is not entirely clear why this error is induced into the system only when the transposed feeder is faulted, it is believed that the induced impedance of both bundles is affected by the transposition at the point of sensing.

Another problem associated with this parallel feeder transposition relates to manufacturing time and error. The additional time required to un-bundle the parallel feeders and route them through the current sensors adds an additional burden on the manufacturing process which increases costs. The potential for manufacturing error also is increased for this system as the six parallel feeders are required to be routed through two current sensors after two of the feeders are transposed. Problems of the wrong parallel feeders in the wrong current sensor are typically found during aircraft testing where the cost of rework to both schedule and profit is very high.

Still another problem associated with the prior art systems utilizing parallel feeder bundle sensing is that, in addition to the generator current sensors 50, 52, 54, separate line current sensors 56, 58, 60 are required to detect other distribution faults such as single and multiple phase to phase and phase to neutral low impedance faults. These additional sensors increase manufacturing and design costs, decrease control unit reliability, as well as increasing the overall complexity of the system.

The present invention is directed to overcoming one or more of the above problems.

SUMMARY OF THE INVENTION

It is the principle objective of the present invention to provide a new and useful system of protection for distribution systems having parallel feeders. More specifically, it is the objective to provide protection against single and multiple high impedance and open parallel feeder faults, single and multiple high impedance and open phase faults, and single and multiple phase to phase and phase to neutral low impedance faults.

The system of protection for an electric power distribution system which has at least two parallel power feeders for each electrical phase coupling a source of electrical energy through a contactor device to a load distribution bus comprises a controller and a parallel feeder current sensor for each parallel power feeder which sense electrical current conducted therein. The parallel feeder current sensors produce output parallel current sense signals proportional to the magnitude of the parallel feeder current sensed, and are coupled to the controller by conductors which communicate the output parallel current sense signals thereto. The controller comprises circuitry which compares the magnitudes of the output parallel current sense signals for each electrical phase. This comparison circuitry generates an output protection signal when the magnitudes of the output parallel current sense signals differ by at least an amount sufficient to indicate a high impedance fault on at least one of the parallel power feeders. The protection system further comprises circuitry to isolate the high impedance fault by opening the contactor device and de-energizing the source of electrical energy.

The protection system further comprises phase current sensors which sense electrical current generated by each phase of the source of electrical energy. The phase current sensors generate output phase current sense signals of proportional magnitude to the actual phase current sensed and are also coupled to the controller by conductors which communicate the output phase current sense signals thereto. These phase current sensors define the entrance to a zone of protection, the exit of which is defined by the parallel feeder current sensors.

To provide protection from high impedance faults for any phase, the ctroller additionally comprises circuitry which compares the magnitudes of the output phase current sense signals. This phase current comparison circuitry generates an output protection signal when the magnitudes of the output phase current sense signals differ by at least an amount sufficient to indicate a high impedance fault for at least one phase of the source of electrical energy.

Protection from single and multiple phase to phase and phase to neutral low impedance faults is provided by circuitry which sum the output parallel sense signals per phase to produce a summed phase current sense signal. This circuitry further determines the difference between the magnitude of the output phase current sense signal and the magnitude of the summed phase current sense signals per phase, and generates an output protection signal when the difference is sufficient to indicate a low impedance fault within said zone of protection defined between the phase current sensors and the parallel feeder current sensors.

Other objectives and advantages will become apparent from the following specification taken in conjunction with the accompanying drawings.

BRIEF DESCRIPTION OF THE DRAWINGS

While the specification concludes with claims particularly pointing out and distinctly claiming that which is regarded as the present invention, the organization, the advantages, and further objects of the invention may be readily ascertained by one skilled in the art from the following detailed description when read in conjunction with the accompanying drawings in which:

FIG. 2 is a series of vector diagrams illustrating the parallel feeder bundle sensing technique utilize by the prior art system of FIG. 1.

DESCRIPTION OF THE PREFERRED EMBODIMENTS

Throughout the following description, the generic term "circuitry" will be utilized as a convenient way of referring to the circuit elements and associated wiring and control logic which perform the functions described. As understood by one skilled in the art, the physical implementation of the circuitry within the embodiments described herein may include analog, digital, or hybrid circuit elements, as well as implementation for processing within a microprocessor.

Figure 1:
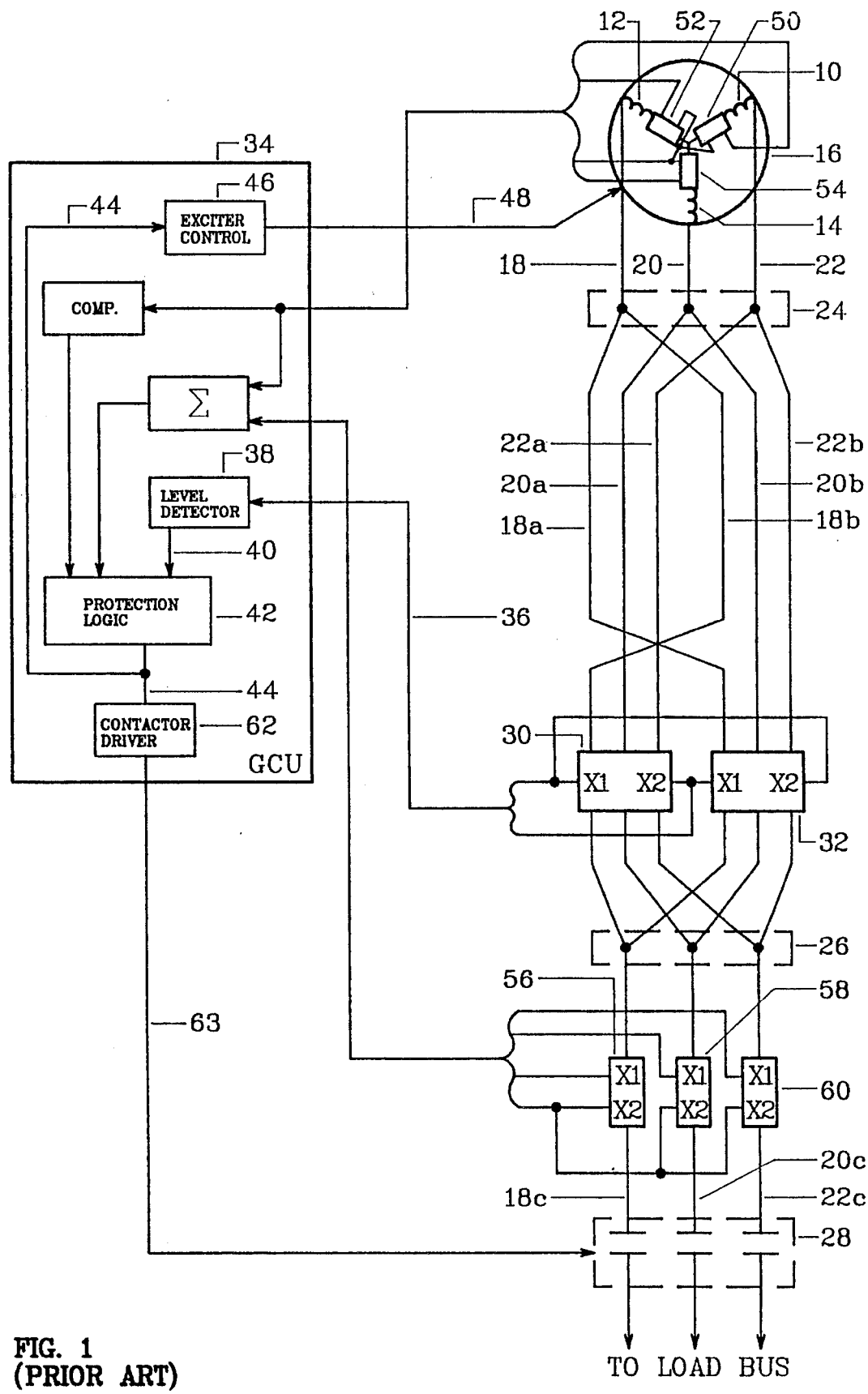
FIG. 1 is a single line schematic diagram illustrating a partial single channel of a prior art electric power generation and distribution system.
Figure 3:
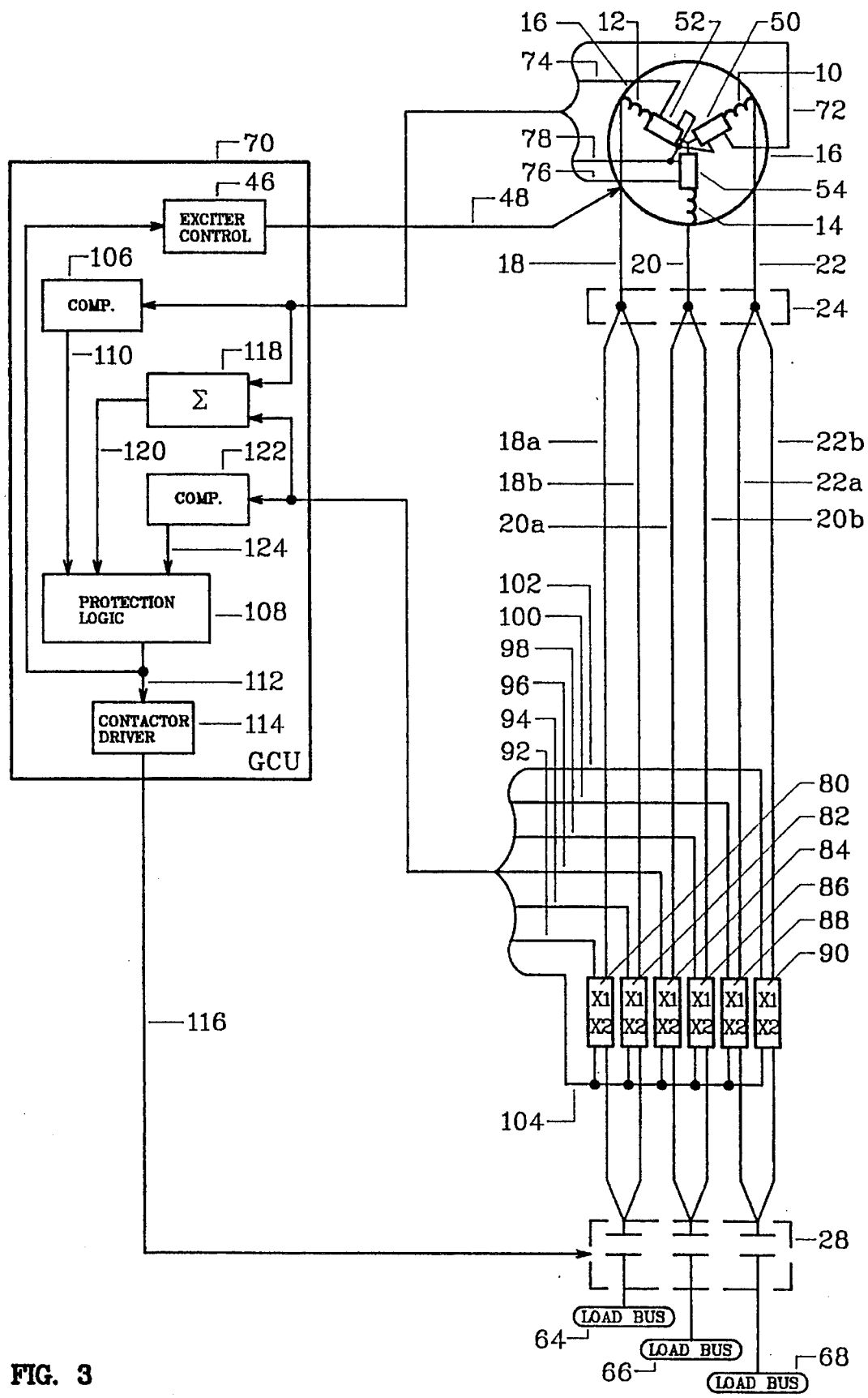
FIG. 3 is a single line schematic diagram illustrating a partial single channel of an electric power generation and distribution system utilizing the system of protection for electric power distribution failures of the instant invention.

FIG. 3 illustrates a partial single channel of an electric power generation system utilizing the system of protection for electric power distribution failures of the instant invention. Each output electrical phase 10, 12, 14 of the engine driven generator 16 is coupled by a single copper power feeder 18, 20, 22 to a terminal block 24 within the aircraft outside the engine nacelle (not shown). These copper power feeders 18, 20, 22 are required due to the harsh environment of this nacelle area through which they are routed. Once within the body of the aircraft however, two parallel aluminum feeders 18a and 18b, 20a and 20b, 22a and 22b are utilized to conduct the electrical energy produced by the generator 16. These parallel feeders 18a and 18b, 20a and 20b, 22a and 22b are coupled to each phase on the terminal block 24 and routed through the aircraft to a generator line contactor 28 which is typically located in the electrical power distribution center in the nose of the aircraft (not shown). The electrical energy conducted by these parallel feeders 18a and 18b, 20a and 20b, 22a and 22b is switchably coupled through the generator line contactor 28 to the load distribution buses 64, 66, 68.

Current sensors, such as current transformers 50, 52, 54, are positioned at the neutral aspect of the generator phase windings 10, 12, 14 and are coupled to a generator control unit 70 by means such as separate output wires 72, 74, 76 and a common return wire 78. Additional current sensors, such as current transformers 80, 82, 84, 86, 88, 90, are positioned in close proximity to the generator line contactor 28 and are coupled to the generator control unit 70 by means such as separate wires 92, 94, 96, 98, 100, 102 and a common return wire 104.

Within the generator control unit 70, a comparator 106 is provided which monitors the signals coupled from the current transformers 50, 52, 54 by the separate output wires 72, 74, 76 and the common return wire 78. The output of the comparator is coupled to protection logic circuitry 108 by line 110. The output of the protection logic circuitry 108 is coupled by line 112 to a contactor driver circuit 114, which is coupled by line 116 to the generator line contactor 28, and to exciter control circuitry 46, which is coupled to the generator 16 by line 48.

Also within the generator control unit 70, summation circuitry 118 is provided which monitors the signals coupled from the current transformers 50, 52, 54 by the separate output wires 72, 74, 76 and the common return wire 78, and the signals coupled from the current transformers 80, 82, 84, 86, 88, 90 by the separate output wires 92, 94, 96, 98, 100, 102 and the common return wire 104. The output of the summation circuitry 118 is coupled by line 120 to the protection logic circuitry 108. A comparator 122 is also provided which monitors the signals coupled from the current transformers 80, 82, 84, 86, 88, 90 by the separate output wires 92, 94, 96, 98, 100, 102 and the common return wire 104. The output of the comparator 122 is coupled by line 124 to the protection logic 108.

An exemplary embodiment of the system of protection of the instant invention is particularly well suited for an electric power distribution system having at least two parallel power feeders 18a and 18b, 20a and 20b, 22a and 22b per phase coupling a source of electrical energy, such as the engine driven generator 16, through a contactor device, hereinafter generator line contactor 28, to a load distribution bus 64, 66, 68. The system of protection comprises a controller, such as generator control unit 70, a parallel feeder current transformer 80, 82, 84, 86, 88, 90 for each parallel power feeder 18a and 18b, 20a and 20b, 22a and 22b which senses electrical current conducted therein. The parallel feeder current transformer 80, 82, 84, 86, 88, 90 produce output parallel current sense signals which are proportional to the magnitude of the parallel feeder current sensed. Means, such as separate wires 92, 94, 96, 98, 100, 102 and common return wire 104, coupling the parallel feeder current transformer 80, 82, 84, 86, 88, 90 to the generator control unit 70 conduct the output parallel current sense signals thereto.

The generator control unit 70 comparator 122 compares the magnitudes of the output parallel current sense signals per phase, that is to say the signal produced by current transformer 80 compared with the signal produced by current transformer 82, the signal from current transformer 84 with the signal produced by current transformer 86, and the signal from current transformer 88 with the signal produced by current transformer 90. The comparator 122 generates a magnitude differential signal per phase which indicates the amount by which the current flowing in one parallel feeder 18a differs from the current flowing in the other parallel feeder 18b for that phase. The generator also comprises protection logic circuitry 108 which processes the magnitude differential signals. This protection logic circuitry 108 generates a output protection signal when any of the magnitude differential signals exceeds a predetermined threshold for a predetermined amount of time.

The magnitude threshold is set to at least an amount sufficient to indicate a high impedance fault on at least one of the parallel power feeders 18a, 18b, 20a, 20b, 22a, 22b. This amount will vary with the current rating of the power generation system and with the gauge of the parallel feeders themselves. A typical threshold for a three phase 115 volt ac, 120 kilovolt-ampere rated generator is 60 amperes difference; although, higher or lower levels may be appropriate based on operating environment and required derating of the system. The time threshold is set to a period which will, while ensuring integrity of the fault, not overheat the unfaulted parallel feeder. A typical threshold for the above described system is three seconds; although, longer or shorter periods may be appropriate based on operating environment and required derating of the system.

The generator control unit 70 further comprises a contactor driver circuit 114 responsive to the output protection signal on line 112 which isolates the high impedance fault. The contactor driver circuit 114 generates an output trip command on line 116 to which the generator line contactor 28 is responsive. The generator line contactor 28 opens when this signal is present, interrupting the flow of electrical current from the generator 16 to the load distribution buses 64, 66, 68.

Further, the generator control unit 70 comprises exciter control circuitry 46 which is responsive to the output protection signal on line 112, de-energizing the generator 16. This de-energization of the generator 16 interrupts the generation and flow of electrical current from the generator, through the high impedance fault, to the load distribution buses 64, 66, 68.

In addition to the parallel feeder current transformers 80, 82, 84, 86, 88, 90, phase current transformers 50, 52, 54 which define the entrance to a zone of protection are utilized to sense electrical current generated by each phase 10, 12, 14 of the generator 16. These phase current transformers 50, 52, 54 generate output phase current sense signals of proportional magnitude to the phase current sensed, and separate output wires 72, 74, 76 and common return wire 78 couple these phase current transformers 50, 52, 54 to the generator control unit 70. To define the exit of this zone of protection, the parallel feeder current transformers 80, 82, 84, 86, 88, 90 are placed sufficiently close to the load distribution bus so as to maximizing the distance from the generator 16 and the phase current transformers 50, 52, 54.

The generator control unit 70 further comprises a comparator 106 which compares the magnitudes of the output phase current sense signals. This phase current comparator 106 generates a phase current difference signal proportional to the magnitude difference between the output phase current sense signals. The protection logic circuitry 108 produces an output protection signal when the magnitude of the phase current differential signal exceeds a predetermined threshold for a predetermined amount of time sufficient to indicate a high impedance fault for at least one phase of the source of electrical energy. A typical threshold for a three phase 115 volt ac, 120 kilovolt-ampere rated generator is 20 amperes difference; although, higher or lower levels may be appropriate based on operating environment and required derating of the system. The time threshold is set to a period which will, while ensuring integrity of the fault, not overheat the generator 16 due to the unbalanced loading resulting from the high impedance fault. A typical threshold for the above described system is four seconds; although, longer or shorter periods may be appropriate based on operating environment and required derating of the system.

Further in accordance with the instant invention, the contactor drive circuitry 114, responsive to the output protection signal, isolates the high impedance fault. The contactor driver circuit 114 generates an output trip command on line 116 to which the generator line contactor 28 is responsive. The generator line contactor 28 opens when this signal is present, interrupting the flow of electrical current from the generator 16 to the load distribution buses 64, 66, 68.

Additionally, the exciter control circuitry 46, responsive to the output protection signal, de-energizes the generator 16. This de-energization of the generator 16 interrupts the generation and flow of electrical current from the generator, through the high impedance fault, to the load distribution buses 64, 66, 68.

The generator control unit 70, in accordance with the instant invention, further comprises summation circuitry 118 which sum the output parallel sense signals per phase to produce a summed phase current sense signal. The summation circuitry 118 further determines the difference between the magnitude of the output phase current sense signal and the magnitude of the summed phase current sense signals per phase to produce an output differential protection signal. The protection logic circuitry 108 produces an output protection signal when the magnitude of the output differential protection signal exceeds a predetermined threshold for a predetermined amount of time sufficient to indicate a low impedance fault within the zone of protection defined between said phase current sensors and said parallel feeder current sensors. A typical threshold for a three phase 115 volt ac, 120 kilovolt-ampere rated generator is 55 amperes difference; although, higher or lower levels may be appropriate based on operating environment and required derating of the system. The time threshold is set to a period which will, while ensuring integrity of the fault, not present an undue fire hazard. A typical threshold for the above described system is 100 milliseconds; although, longer or shorter periods may be appropriate based on operating environment and required derating of the system.

As with the other distribution faults protected against by the preferred embodiment of the instant invention, the contactor drive circuitry 114, responsive to the output protection signal, isolates this low impedance fault as well. The contactor driver circuit 114 generates an output trip command on line 116 to which the generator line contactor 28 is responsive. The generator line contactor 28 opens when this signal is present, interrupting the flow of electrical current from the generator 16 to the load distribution buses 64, 66, 68.

Additionally, the exciter control circuitry 46, responsive to the output protection signal, de-energizes the generator 16. This de-energization of the generator 16 interrupts the generation and flow of electrical current from the generator, through the low impedance fault, to the load distribution buses 64, 66, 68.

A method of protecting an electric power generation system having at least two parallel power feeders 18a, 18b coupling each electrical phase 10, 12, 14 of a generator 16 through a generator line contactor 28 to a load distribution bus 64 from distribution failures, comprises sensing electrical current conducted by each parallel power feeder 18a, 18b to produce an output parallel current sense signal proportional to the magnitude of the parallel feeder current sensed, comparing the magnitude of the output parallel current sense signal for one parallel power feeder 18a to the magnitude of the output parallel current sense signals for the other parallel power feeder 18b for that electrical phase 12, and generating an output protection signal when the magnitude of the output parallel current sense signal for any parallel power feeder 18a differs from the magnitude of the output parallel current sense signal for any other parallel power feeder 18b for that phase 12 by at least an amount sufficient to indicate a high impedance fault on at least one of the parallel power feeders 18a, 18b.

The protection method further comprises the steps of sensing the current generated by each phase 10, 12, 14 of the generator 16 to produce output phase sense signals of proportional magnitude to the phase current sensed, comparing the magnitude of the output phase current sense signal for one phase 10 to the magnitude of the output phase current sense signals for any other phases 12, 14, and generating an output protection signal when the magnitude of the output phase current sense signal differs from the magnitude of the output phase current sense signal for any other phase by at least an amount sufficient to indicate a high impedance fault on at least one of the phases 10, 12, 14.

The protection method further includes summing the magnitude of the output parallel current sense signal for any parallel power feeder 18a with the magnitude of the output parallel current sense signal for all other parallel power feeders 18b for that phase 12 to generate a summed phase current sense signal, determining the difference between the output phase current sense signal and the summed phase current sense signal for each phase, and generating an output protection signal when the magnitude of the output phase current sense signal and the magnitude of the summed phase current sense signal differ by at least an amount sufficient to indicate a low impedance fault on at least one of the phases 10, 12, 14.

The method further comprises the step of issuing a contactor trip command in response to the protective trip signal to open the generator line contactor 28 and interrupt the flow of electrical energy from the generator 16 to the load distribution bus 64.

Numerous modifications and alternative embodiments of the invention will be apparent to those skilled in the art in view of the foregoing description. Accordingly, this description is to be construed as illustrative only and is for the purpose of teaching those skilled in the art the best mode of carrying out the invention. The details of the structure may be varied substantially without departing from the spirit of the invention, and the exclusive use of all modifications which come within the scope of the appended claims is reserved.

We claim:

1. A system of protection for an electric power distribution system having at least three phases and at least two parallel power feeders per phase coupling a source of electrical energy through a contactor device to a lead distribution bus, comprising:

a controller;

an individual parallel feeder current sensor associated with each individual parallel power feeder sensing electrical current conducted therein, said parallel feeder current sensors producing output parallel current sense signals proportional to the magnitude of the parallel feeder current sensed thereby;

means coupling said parallel feeder current sensors to said controller for conducting said output parallel current sense signals thereto; and wherein said controller comprises a comparator having an input coupled to said parallel feeder current sensors by said coupling means and an output, said comparator comparing the magnitudes of said output parallel current sense signals per phase, said comparator further generating a magnitude differential signal per phase, and protection logic circuitry, coupled to said output of said comparator, processing said magnitude differential signals, said protection logic circuitry generating a first output protection signal when any of said magnitude differential signals exceeds a predetermined threshold for a predetermined amount of time sufficient to indicate a high impedance fault on at least one of the parallel power feeders.

2. A protection system as recited in claim 1, wherein said controller further comprises driver circuitry, responsive to said first output protection signal, isolating the high impedance fault, said driver circuitry generating an output trip command to which the contactor device is responsive, opening the contactor device and interrupting the flow of electrical current from the source of electrical energy to the load distribution bus thereby.

3. A protection system as recited in claim 1, wherein said controller further comprises exciter control circuitry, responsive to said first output protection signal, de-energizing the source of electrical energy, said exciter control circuitry interrupting the generation and flow of electrical current from the source of electrical energy through the high impedance fault to the load distribution bus.

4. A protection system as recited in claim 1, wherein said parallel feeder current sensors are positioned sufficiently close to the load distribution bus so as to maximize the distance from the source of electrical energy.

5. A protection system as recited in claim 4, further comprising:

phase current sensors, defining the entrance to a zone of protection, sensing electrical current generated by each phase of the source of electrical energy, said phase current sensors generating output phase current sense signals of proportional magnitude to the phase current sensed thereby;

means coupling said phase current sensors to said controller for conducting said output phase current sense signals thereto; and wherein the exit of said zone of protection is defined by said parallel feeder current sensors.

6. A protection system as recited in claim 5, wherein said controller further comprises:

a phase current comparator, coupled to said phase current sensors by said coupling means, comparing the magnitudes of said output phase current sense signals, said phase current comparator generating a phase current difference signal proportional to the magnitude difference between said output phase current sense signals; and wherein said protection logic circuitry produces a second output protection signal when the magnitude of said phase current differential signal exceeds a predetermined threshold for a predetermined amount of time sufficient to indicate a high impedance fault for at least one phase of the source of electrical energy.

7. A protection system as recited in claim 6, wherein said controller further comprises drive circuitry, responsive to both said first output protection signal and said second output protection signal, isolating the high impedance fault, said drive circuitry generating an output trip command to which the contactor device is responsive, opening the contactor device and interrupting the flow of electrical current from the source of electrical energy to the load distribution bus thereby.

8. A protection system as recited in claim 6, wherein said controller further comprises exciter control circuitry, responsive to both said first output protection signal and said second output protection signal, de-energizing the source of electrical energy, said exciter control circuitry interrupting the generation and flow of electrical current from the source of electrical energy through the high impedance fault to the load distribution bus.

9. A protection system as recited in claim 5, wherein said controller further comprises:

summation circuitry, coupled to said parallel feeder current sensors by said coupling means, summing said output parallel current sense signals per phase to produce a summed phase current sense signal, said summation circuitry further determining the difference between the magnitude of said output phase current sense signal and the magnitude of said summed phase current sense signals per phase to produce an output differential protection signal; and wherein said protection logic circuitry produces a second output protection signal when the magnitude of said output differential protection signal exceeds a predetermined threshold for a predetermined amount of time sufficient to indicate a low impedance fault within said zone of protection defined between said phase current sensors and said parallel feeder current sensors.

10. A protection system as recited in claim 9, wherein said controller further comprises driver circuitry, responsive to both said first output protection signal and said second output protection signal, isolating both the high impedance fault and the low impedance fault, said driver circuitry generating an output trip command to which the contactor device is responsive, opening the contactor device and interrupting the flow of electrical current from the source of electrical energy to the load distribution bus thereby.

11. A protection system as recited in claim 9, wherein said controller further comprises exciter control circuitry, responsive to both said first output protection signal and said second output protection signal, de-energizing the source of electrical energy, said exciter control circuitry interrupting the generation and flow of electrical current from the source of electrical energy.

12. An electric power generation system, comprising:

a source of electrical energy having at least three output phases;

a load distribution bus;

at least two electrically parallel power feeders conductively coupling each output phase of said source of electrical energy to said load distribution bus;

a controller;

a parallel feeder current sensor for each parallel power feeder sensing electrical current conducted therein, said parallel feeder current sensor producing an output parallel current sense signal proportional to the magnitude of the parallel feeder current sensed thereby;

means coupling each parallel feeder current sensor to said controller for conducting said output parallel current sense signal thereto; and wherein said controller comprises a comparator having an input coupled to said parallel feeder current sensors by said coupling means and an output, said comparator comparing the magnitudes of said output parallel current sense signals per phase, said comparator generating a magnitude differential signal per phase, and protection logic circuitry processing said magnitude differential signals, said protection logic circuitry further generating a first output protection signal when any of said magnitude differential signals exceeds a predetermined threshold for a predetermined amount of time sufficient to indicate a high impedance fault on at least one of the parallel power feeders.

13. An electric power generation system as recited in claim 12, further comprising:

a contactor device interposed between said source of electrical energy and said load distribution bus, said contactor device switchably coupling each phase of said source of electrical energy to said load distribution bus via said parallel power feeders; and wherein said contactor device opens in response to said first output protection signal interrupting the flow of electrical energy from said source of electrical energy to said load distribution bus thereby.

14. An electric power generation system as recited in claim 12, wherein said controller further comprises exciter control circuitry, responsive to said first output protection signal, de-energizing said source of electrical energy, said exciter control circuitry interrupting the generation and flow of electrical current from said source of electrical energy through the high impedance fault to said load distribution bus.

15. An electric power generation system as recited in claim 12, wherein said parallel feeder current sensors are positioned sufficiently close to said load distribution bus so as to maximize the distance from said source of electrical energy.

16. An electric power generation system as recited in claim 15, further comprising:

phase current sensors, defining the entrance to a zone of protection, sensing electrical current generated by each output phase of said source of electrical energy, said phase current sensors generating output phase current sense signals of proportional magnitude to the phase current sensed thereby;

means coupling said phase current sensors to said controller for conducting said output phase current sense signals thereto; and wherein the exit of said zone of protection is defined by said parallel feeder current sensors.

17. An electric power generation system as recited in claim 16, wherein said controller further comprises:

a comparator having an input coupled to said phase current sensors by said coupling means and an output, said comparator comparing the magnitudes of said output phase current sense signals, said phase current comparator generating a phase current difference signal proportional to the magnitude difference between said output phase current sense signals; and wherein said protection logic circuitry produces a second output protection signal when the magnitude of said phase current differential signal exceeds a predetermined threshold for a predetermined amount of time sufficient to indicate a high impedance fault for at least one phase of the source of electrical energy.

18. An electric power generation system as recited in claim 17, further comprising:

a contactor device interposed between said source of electrical energy and said load distribution bus, said contactor device switchably coupling each phase of said source of electrical energy to said load distribution bus via said parallel power feeders; and wherein said contactor device opens in response to both said first output protection signal and said second output protection signal interrupting the flow of electrical energy from said source of electrical energy to said load distribution bus thereby.

19. An electric power generation system as recited in claim 17, wherein said controller further comprises exciter control circuitry, responsive to both said first output protection signal and said second output protection signal, de-energizing said source of electrical energy, said exciter control circuitry interrupting the generation and flow of electrical current from said source of electrical energy through the high impedance fault to said load distribution bus.

20. An electric power generation system as recited in claim 16, wherein said controller further comprises:

parallel current summation circuitry, coupled to said parallel feeder current sensors by said coupling means, summing said output parallel current sense signals per phase to produce a summed phase current sense signal, said summation circuitry further determining the difference between the magnitude of said output phase current sense signal and the magnitude of said summed phase current sense signals per phase to produce an output differential protection signal; and wherein said protection logic circuitry produces a second output protection signal when the magnitude of said output differential protection signal exceeds a predetermined threshold for a predetermined amount of time sufficient to indicate a low impedance fault within said zone of protection defined between said phase current sensors and said parallel feeder current sensors.

21. An electric power generation system as recited in claim 20, further comprising:

a contactor device interposed between said source of electrical energy and said load distribution bus, said contactor device switchably coupling each phase of said source of electrical energy to said load distribution bus via said parallel power feeders; and wherein said contactor device opens in response to both said first output protection signal and said second output protection signal interrupting the flow of electrical energy from said source of electrical energy to said load distribution bus thereby.

22. An electric power generation system as recited in claim 20, wherein said controller further comprises exciter control circuitry, responsive to both said first output protection signal and said second output protection signal, de-energizing said source of electrical energy, said exciter control circuitry interrupting the generation and flow of electrical current from said source of electrical energy.

23. A method of protecting an electric power generation system having at least three phases and at least two parallel power feeders coupling each electrical phase of a source of electrical energy through a contactor device to a load distribution bus from distribution failures, comprising the steps of:

sensing electrical current conducted by each parallel power feeder to produce an output parallel current sense signal proportional to the magnitude of the parallel feeder current sensed thereby;

comparing the magnitude of said output parallel current sense signal for one parallel power feeder to the magnitude of said output parallel current sense signals for the other parallel power feeders for that electrical phase; and generating a first output protection signal when the magnitude of said output parallel current sense signal for any parallel power feeder differs from the magnitude of said output parallel current sense signal for any other parallel power feeder for that phase by at least an amount sufficient to indicate a high impedance fault on at least one of the parallel power feeders.

24. A method of protection as recited in claim 23, further comprising the step of issuing a contactor trip command to open the contactor and interrupt the flow of electrical energy from the source of electrical energy to the load distribution bus thereby.

25. A method of protection as recited in claim 23, further comprising the step of sensing the current generated by each phase of the source of electrical energy to produce output phase sense signals of proportional magnitude to the phase current sensed thereby.

26. A method of protection as recited in claim 25, further comprising the steps of:
comparing the magnitude of said output phase current sense signal for one phase to the magnitude of said output phase current sense signals for any other phases; and
generating a second output protection signal when the magnitude of said output phase current sense signal differs from the magnitude of said output phase current sense signal for any other phase by at least an amount sufficient to indicate a high impedance fault on at least one of the phases.

27. A method of protection as recited in claim 26, further comprising the step of issuing a contactor trip command to open the contactor and interrupt the flow of electrical energy from the source of electrical energy to the load distribution bus thereby.

28. A method of protection as recited in claim 25, further comprising the steps of:
summing the magnitude of said output parallel current sense signal for any parallel power feeder with the magnitude of said output parallel current sense signal for all other parallel power feeders for that phase to generate a summed phase current sense signal;
determining the difference between said output phase current sense signal and said summed phase current sense signal for each phase; and
generating a second output protection signal when the magnitude of said output phase current sense signal and the magnitude of said summed phase current sense signal differ by at least an amount sufficient to indicate a low impedance fault on at least one of the phases.

29. A method of protection as recited in claim 28, further comprising the step of issuing a contactor trip command to open the contactor and interrupt the flow of electrical energy from the source of electrical energy to the load distribution bus thereby.

* * * * *